United States Patent Office 3,447,089
Patented May 27, 1969

3,447,089
HIGH-SPEED MEASURING SYSTEMS AND METHODS
Gerard M. Foley, Ambler, Pa., assignor to Leeds & Northrup Company, a corporation of Pennsylvania
Filed Feb. 18, 1965, Ser. No. 433,678
Int. Cl. H03k 17/00, 5/00
U.S. Cl. 328—151                                           5 Claims This invention relates to measuring systems in which data-processing circuitry is utilized for high-speed comparison measurements, and particularly relates to high-speed optical pyrometry.

In prior comparison-measurement systems which repetitively sample the unknown and a reference, a high-pass filter, such as a capacitor or a transformer, is used for removal of the DC component common to both the unknown and the reference. With such systems operating at optimum sampling rate, it is necessary to take a substantial number of samples, the number depending upon the time-constant of a rebalancing system, before an integrator accumulates the true value of the error.

In systems incorporating the present invention, no high-pass filter is used and, for the same sampling rate, the full values of the unknown and of the reference can be stored in a single sampling cycle so at once to provide the true error information necessary and sufficient to readjust the reference for null balancing systems, or in cases where readjustment of the reference is inconvenient or impractical, to stop the comparison because a match has been passed and to save the comparison data for accurate determination of the true value of the unknown or for process control.

More particularly, signal samples from the two sources under comparison are alternately applied during a sampling cycle to an integrator means for integration during successive measuring cycles; for each measuring cycle, the value of the integration corresponding with the sample from one of the sources is stored and the output of the storage means is compared with the most recent value of output of the integrator means which corresponds with the sample from the other of the two sources.

In accordance with one form of the present invention, the analog values of an unknown and a reference, as alternately sampled, are each integrated over its sampling period and changed to digital form by an analog-to-digital (ADC) converter. In the interval between successive conversions, the converted value of the integral of the last sample may be compared with the analog value of the integral of the sample next to be converted to determine whether the unknown, within a small predetermined positive or negative tolerance, matches the known; such comparison may be made by the same comparator which during each conversion cycle decides whether the applied analog has been matched by the incrementally-stepped internal digital reference of the converter. Alternately, the digitized values of the last two samples as respectively stored in output registers of the analog-to-digital converter may be compared in each sampling cycle by a comparator external to the converter.

In other forms of the invention, no analog-to-digital converter is used. In one of such other forms, the samples from the unknown and reference sources are applied to different integrators and the stored analog output of one of them is compared with the analog ouptut of the other during each sampling cycle.

In still other forms of the invention, the samples from the two sources are sequentially applied to a single integrator of type which converts an applied analog signal to a group of pulses in number corresponding with the analog value of the integral: the pulse groups are applied to a scaler or counter and comparison of the number of pulses in successive groups respectively corresponding with unknown and reference samples may be made either by subtraction in the scaler itself or by additional registers and comparator means.

Further in accordance with the invention, the successive samples of the reference, for example, may be cyclically modified as a predetermined incremental function of time between predetermined upper and lower limits of a range of measurement embracing the value of the unknown whether fixed or variable: alternatively, with a reference of fixed value, the successive samples of the unknown may be subjected to an attenuating effect which is cyclically modified as a predetermined incremental function of time so to insure the aforesaid relative change in sign of a pair of reference and unknown samples to stop the comparison because a match has been passed and to save the comparison for accurate determination of the true value of the unknown or for process control.

More specifically, in optical pyrometry, the light outputs from the reference source and the unknown source are alternately switched by optical-switch means for application to a single signal channel including an electron-multiplier phototube. For comparison of the temperatures of such sources, the integrated analog outputs of the phototube may be changed to corresponding digital signals or displays by an analog-to-digital converter (ADC) under control of timing and logic circuitry which is synchronized with the sampling switch means or integrated values of successive outputs may be compared in any of the other ways above briefly described.

The invention further resides in measuring systems having new and useful features of combination and arrangement hereinafter described and claimed.

For a more detailed understanding of the invention, reference is made to the following description of various specific forms thereof and to the accompanying drawings in which.

Figure 1:
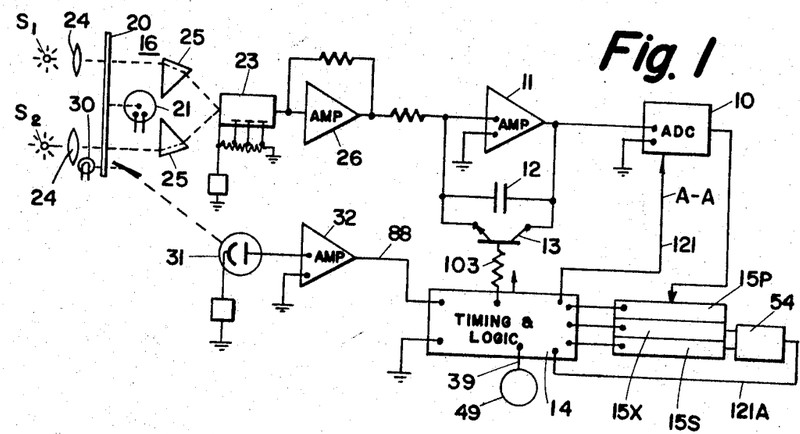
FIG. 1 diagrammatically illustrates the invention as incorporated in an optical pyrometer system.
Figure 2:
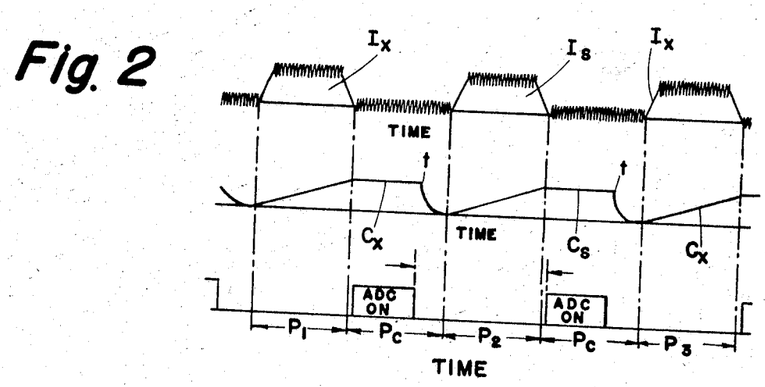
FIGS. 2 and 3 are explanatory figures referred to in discussion of operation of FIG. 1.

In the measuring-system circuitry schematically shown in FIG. 1, the input circuit of the analog-to-digital converter 10 includes an integrating amplifier 11 to which signal samples respectively representative of the outputs of sources S1, S2 are alternately supplied in successive sampling periods $p1$, $p2$, $p3$ et seq. (FIG. 2). Specifically, during each of the odd-numbered sampling periods $p1$, $p3$ et seq., a current pulse $Ix$ of amplitude dependent upon the output of source S2 is applied to amplifier 11; and during each even-numbered sampling periods $p2$, $p4$ the input to amplifier 11 is a pulse $Is$ of amplitude dependent upon the output of source S1. It will be understood that a sampling cycle includes two sampling periods, one for the unknown and one for the reference.

During each of the sampling periods, the applied signal is integrated by capacitor 12 and as temporarily stored therein during the subsequent conversion period Pc provides an analog input for the analog-to-digital converter (ADC) 10. During each of the intersampling intervals Pc, the converter 10 is turned ON (FIG. 2) by the logic circuitry 14 to convert the analog value of the preceding stored pulse Cx or Cs to a digital value temporarily stored in the register 15p. At time t, near the end of each of intervals Pc, the capacitor 12 is discharged by brief closure of switch 13 under control of the timing circuit 14. The operation of circuit 14 is synchronized with the switching means 16 which provides for alternate sampling of the outputs from signal sources S1 and S2.

The digital values temporarily appearing in the three registers 15p, 15x, 15s at any instant are those of two successive samples from source S1 and an intervening sample from source S2 or of two samples from source S2 and an intervening sample from source S1. Specifically, the digital value appearing in register 15p at the end of a conversion cycle is that of the last integrated Ix or Is sample: the digital value appearing in register 15x is that of the previously converted Ix sample; and the digital value appearing in register 15s is that of the previously converted Is sample.

Upon completion of each sampling cycle, the full error information is available by a digital-digital comparison as afforded by comparator 54. When the output signal of comparator 54 changes sign, it means that the match point of the unknown and reference has just been passed and such change in sign may be used to inhibit, at least temporarily, further operation of the timing/logic circuitry 14 via line 121A. Also at the end of each sampling cycle, the full error information is available by an analog-analog comparison as afforded by the internal comparator of the ADC, and as later explained in discussion of FIGS. 9–11.

In some applications the unknown source initially has a value which lies on one side of the value of the reference, and finally has a value lying on the other side of the value of the reference, and it is necessary to measure accurately the time at which the two are equal. For such applications, a timer or clock can be stopped by the signal which is used to inhibit the further operation of the timing/logic circuitry 14. The clock will then indicate the time at which the change in sign of the output comparator occurred and the time of equality of the two sources will be known to lie during the time interval defined by the last two unknown samples preceding the change in sign of the comparator. The time of equality is more precisely determined from the stored values of the last two successive unknown samples and the stored value of the intervening reference sample by interpolation with an accuracy which is a small fraction of the sampling cycle. For example, an instrument system with a sampling cycle of 400 microseconds is capable of determining the time of equality of an unknown source with a reference source with an accuracy of better than 40 microseconds.

For other applications, the output from either of sources S1, S2 may be programmed to vary during a measuring cycle as a function of time to cross the output of the other; the difference between a programmed sample and the preceding unprogrammed sample is compared with the corresponding difference between the immediately preceding pair of samples; and when the difference changes sign, the analog value of the unprogrammed sample is identified as lying in the time/amplitude interval between two successive programmed samples.

The location of the unprogrammed sample within the now-known time/amplitude interval is more precisely determined from the stored values of the two successive programmed samples and the stored value of the intervening unprogrammed sample by interpolation with an accuracy which may be as high as that of the best null-balanced measuring systems without requiring the long balancing time required for systems of that type.

Figure 4:
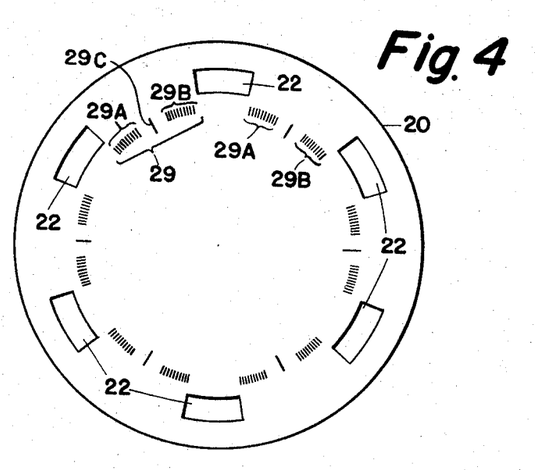
FIG. 4 is illustrative of a shutter disc suitable for use as the light-sampling switch means of FIG. 1.

In optical-pyrometry systems using the invention, the alternate sampling of radiation from the standard lamp S1 and a furnace or other unknown temperature source S2 may be effected as shown in FIG. 1 by a switching means 16 which includes a rotating shutter 20 (FIG. 4) driven by motor 21. The angularly spaced slots 22 of the disc 20 alternately permit passage of the light from source S1, S2 to the light-sensitive cathode of the electron multiplier phototube 23. Each of the two light paths includes a suitable optical system exemplified in simplified form by a single lens 24 and a prism 25.

Figure 9:
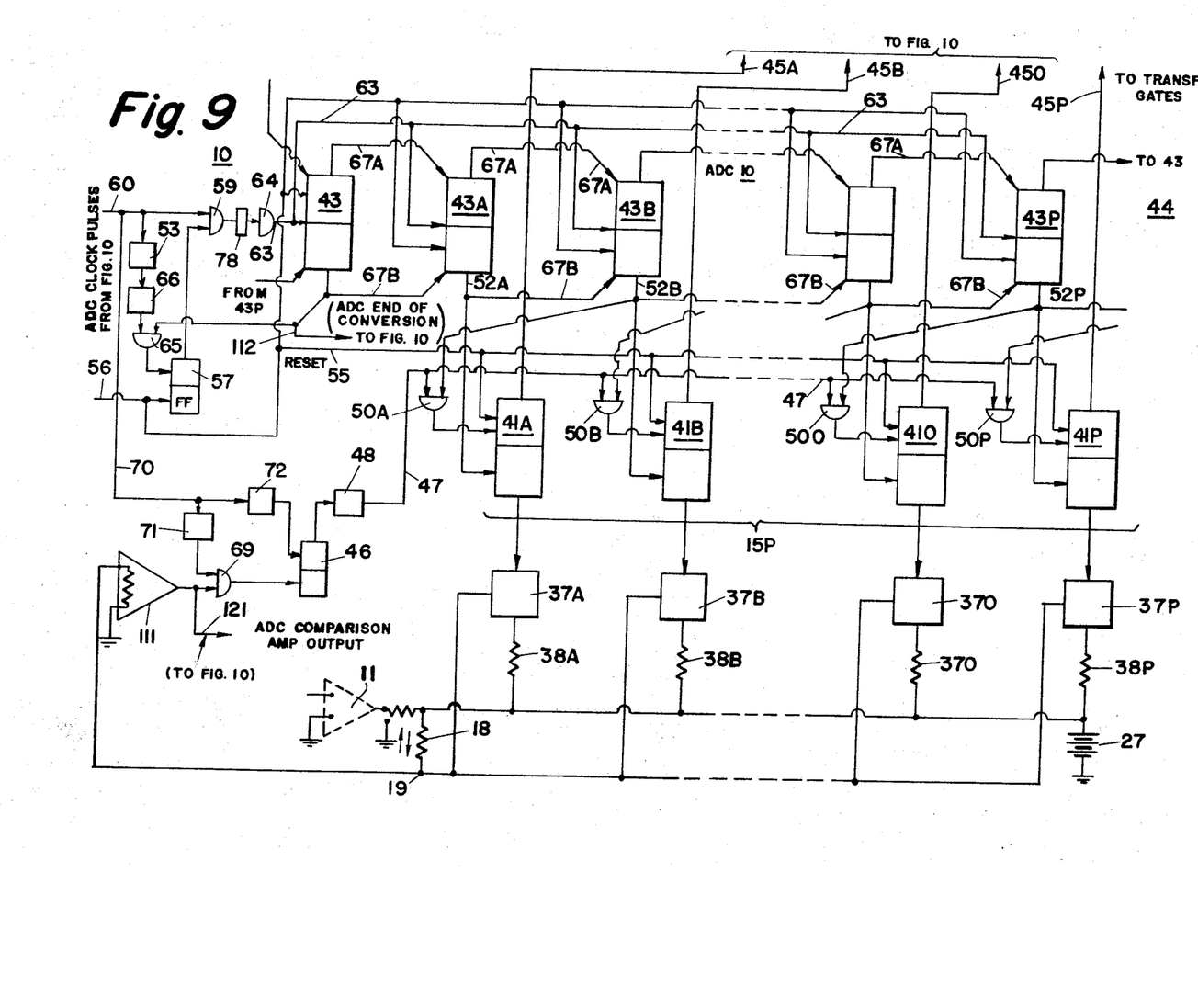
FIG. 9 is a logic diagram of an ADC suitable for the measuring system of FIG. 1.
Figure 10:
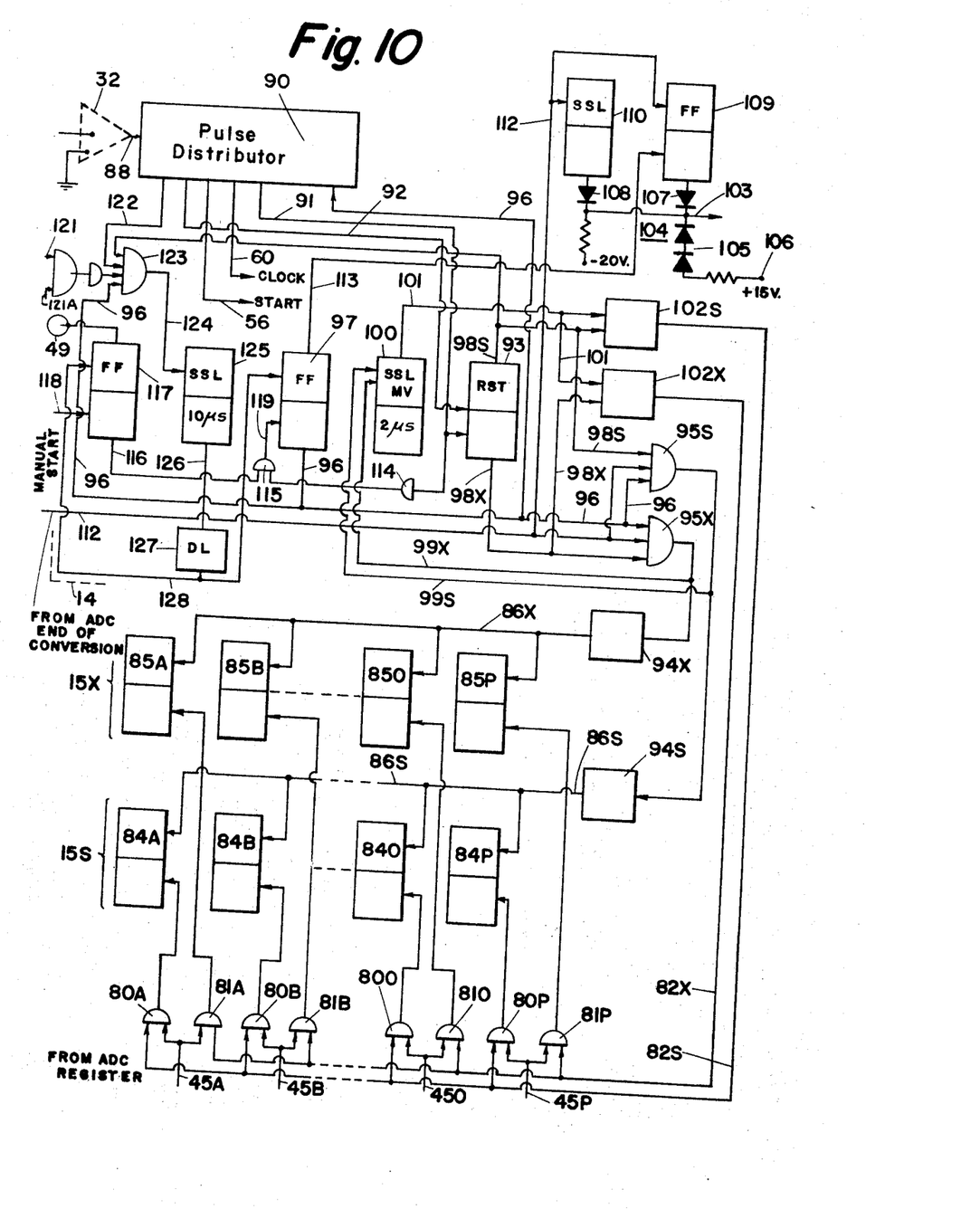
FIG. 10 is a diagram of circuitry suitable for the timing block of FIG. 1.

The anode current of tube 23 consequently consists of two interlaced trains of current pulses, the amplitude or peak values of the Ix pulses (FIG. 2) representing the intensity or brightness of the unknown radiation source S2 and the amplitude or peak values of the Is pulses representing the intensity or brightness of the reference source S1. The groups 29 of narrow slots in disc 20 cooperate with lamp 30, phototube 31 and amplifier 32 to provide the timing and logic circuit 14 with pulses which maintain synchronism between the sampling operations; the integration and storage of the analog samples; the conversion from analog-to-digital values of such samples; clearing of the sample storage in integrator-amplifier 11; transfer of digital values in the ADC register 15p to one or the other of register 15x, 15s; and other operational phases later described. A preferred form of the timing and logic circuitry 14 is shown in FIGS. 9 and 10 later described.

For applications in which it is simply desired to know when the source S2, for example, a furnace charge, rises or falls to a desired temperature, the current to the reference lamp S1 may be set to that filament temperature calibration. Alternatively, the light from the reference lamp S1 operating at fixed known temperature may be attenuated by calibrated filter means to the desired intensity value. In either case, the ADC 10 is permitted to run continuously. In such applications, as soon as the temperature of the unknown matches the reference, the pulse on line 39 may be used to change, in proper sense, the supply of energy to the furnace.

Figure 5:
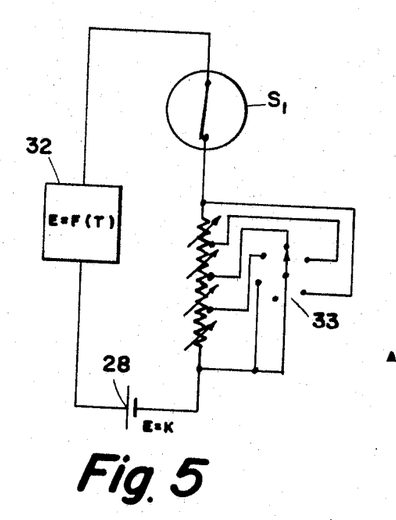
FIG. 5 schematically illustrates an arrangement for varying the standard light source of FIG. 1.
Figure 6:
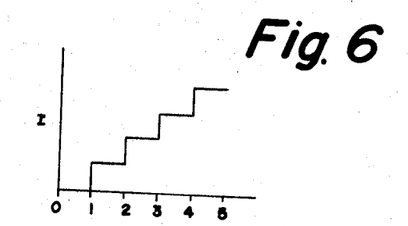
FIGS. 6, 6A and 6B are explanatory figures referred to in discussion of FIG. 5.
Figure 6A:
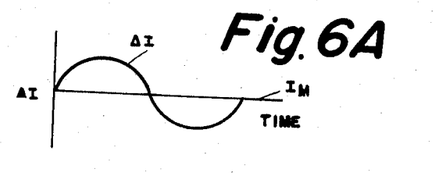
Figure 6B:
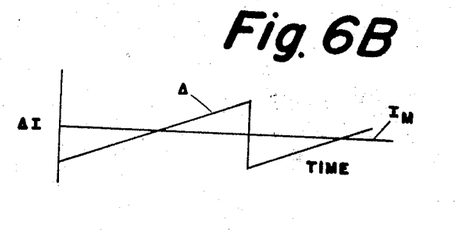

For wide-range optical-pyrometry, the current-supply circuit for the reference lamp S1 (FIG. 5) may include a constant voltage source 28 and a sweep voltage source 32 in series with one or more range resistor-switch combinations 33. The sweep voltage which may be of any desired waveform, such for example the stepped waveform of FIG. 6, the sine-wave of FIG. 6A, or the sawtooth-wave of FIG. 6B, is superimposed upon the level established by the DC source 28. Thus, the average temperature of the source S1 may be set to a known value $Im$ as determined by the average value of the filament current of lamp S1, and the instantaneous temperature cyclically varied over a known range by the periodic component $\Delta I$ of the filament current.

Figure 3:
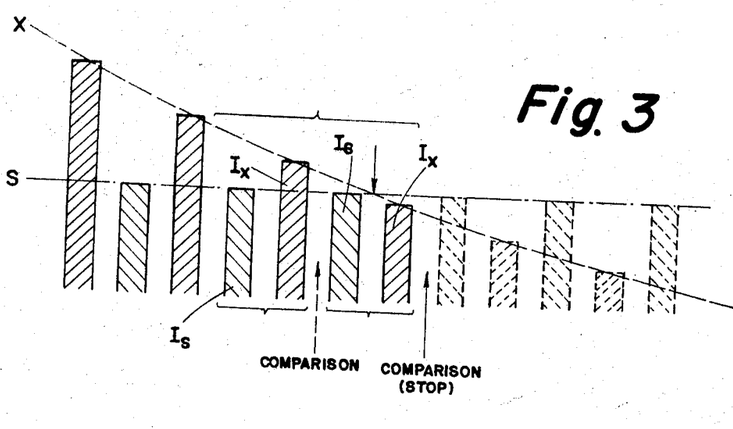
Figure 7:
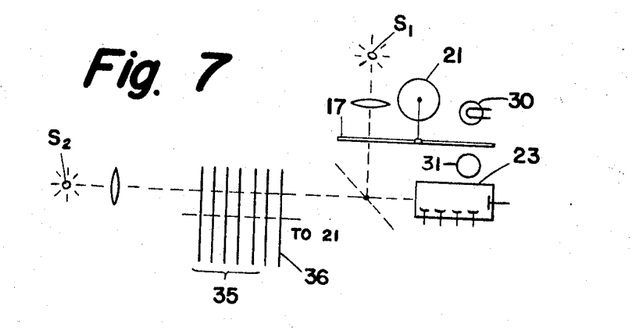
FIG. 7 diagrammatically illustrates a modification of the optical system of FIG. 1.
Figure 8:
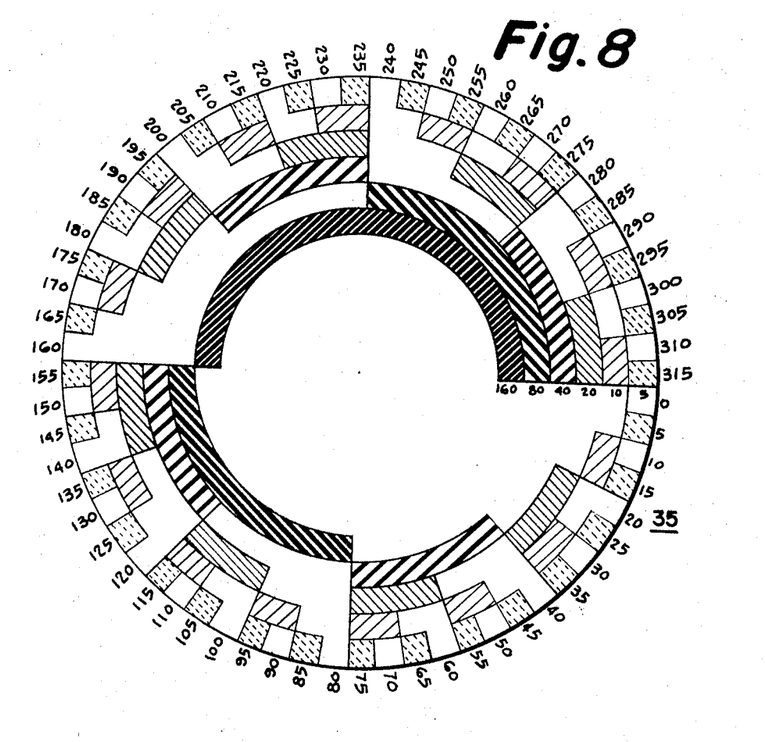
FIG. 8 is illustrative of a stepped light attenuator used in the system of FIG. 7.

The optical system of FIG. 7 may be substituted for that shown in FIG. 1. In this arrangement, the light path from source S2 to the detector 23 includes a multi-step rotating attenuator 35 and a light chopper disc 36 driven by or in synchronism with motor 21 to provide a repeating series of light pulses of progressively varying amplitude. Attenuation in 32 steps of 5 mireds from 0 to 315 mireds may be obtained with a six-disc attenuator 35 whose discs respectively have radial attenuating sectors of different angular extents and of different densities corresponding with the six marked rings of FIG. 8. In that figure, the rings shown are of progressively different diameters clearly to show the attenuating pattern: it will be understood that the discs 35 may be of the same diameter and each has radial sectors of angular spacing and density to afford the attenuating pattern shown by a corresponding one of the rings of FIG. 8. With such arrangement, the waveform or envelope of each train of light pulses is a staircase similar to FIG. 6 rather than a sine-wave as in FIG. 6A. The light path from source S1 (FIG. 7) to detector 23 includes a shutter disc 17 slotted and timed to provide a second train of spaced pulses Ix of fixed amplitude (FIG. 3). So far as operation of the system is concerned, it is immaterial which of the two optical systems (FIG. 1, FIG. 7) is used.

Suitable circuitry for the ADC converter of FIG. 1 is shown in FIG. 9. It is similar to that shown in copending application Ser. No. 395,669, filed Sept. 11, 1964 (now patent 3,354,452) without the linearizing circuitry. The output of the integrator-amplifier 11 is supplied to the comparator-amplifier 111 of the ADC 10 via the summing resistor 18. In each cycle of the ADC, selected switches of the series 37A–37P are left closed to provide for flow through the resistor 18 from reference source 27 of current in direction opposite to the current from the integrator-amplifier 11. The magnitude of such opposing reference current depends upon which switches 37A–37P are left closed to complete a current path from source 27 to resistor 18 through corresponding selected resistors 38A–38P. For a binary-coded decimal system, these switches and resistors may be considered here as divided into four groups, each group having four stages with the resistors calibrated to afford a coded binary count to four decimal places.

The switches 37A–37P may be of solid-state type such as disclosed, for example, in FIG. 10 of aforesaid copending application Ser. No. 395,669 and each is turned ON and OFF by a corresponding one of the flip-flops 41A–41P. This series of flip-flops provides the ADC register 15p of FIG. 1. The flip-flops 41A–41P are each in turn set by a corresponding stage 43A–43P of the ring counter 44. The first stage 43 of the ring counter is a dummy stage for storing a 1 signal at the end of a conversion cycle.

During each conversion cycle, the flip-flops 43A–43P are successively turned ON and OFF progressively to advance the 1 signal in the ring counter 44 from one stage to the next for each of the successive shift pulses appearing on line 63. As each of these flip-flops is turned ON, the 1 level on its output line 52 turns ON the companion feedback flip-flop 41 to connect a corresponding one of the resistors 38 between the summing point 19 and reference source 27 to check whether or not that resistor should be left in circuit for the finalized reference current. It is not left in circuit when a coincidence of pulses on decision line 47 and the output line 52 from the next stage of the ring counter 44 turns OFF the feedback flip-flop via the associated AND-gate 50, as later described. For example, if in a particular measuring cycle the integrated analog value of Ix or Is corresponds with the reference current value of 3571, the switches left turned ON at the end of the ADC cycle for readout are 38P of the units group 38M–38P, 38J, 38K, 38L of the 10's group 38I–38L; 38G–38H of the 100's group; 38E–38H and 38C–38D of the 1,000's group 38A–38D.

The foregoing conversion for decimal-digit conversion is based on the 8421 binary code: a decimal-digit count based on other codes or a binary-digit count may be used by the use of differently calibrated resistors.

At the start of a conversion cycle, the pulse appearing on line 55 resets the register 15p by turning OFF those of its stages left ON in the prior cycle for registering purposes, and also resets the ring counter 44 in event a 1 had not been set into its stage 43 or has erroneously added extra 1's to some other stage. With the flip-flop 57 turned ON by a Start signal on line 56, the AND-gate 59 is enabled to pass clock pulses appearing on line 60 to the differentiator 78 so to produce a pulse when a clock pulse changes level in one direction (for example, negative). The driver 64 in response to each output pulse of differentiator 78 produces a shift pulse on line 63 to all stages of the ring counter 44.

The clock pulses on line 60 are also differentiated by differentiator 53, each to produce a sharp pulse when the clock pulse changes level in one direction (for example, negative). This pulse is retarded by delay device 66 to afford sufficient delay after a shift pulse on line 63 to insure that register 44 has completed shifting. The delayed signal, as applied to AND-gate 65, is used to interrogate the state of the dummy stage 43 of the shift register 44. Thus, after a Start signal occurs on line 56, a shift will occur, causing output line 67B of stage 43 to disable AND-gate 65 and prevent it from being turned OFF by a clock pulse on line 60. The flip-flop 57 is turned OFF only after a sufficient number of pulses have been provided on line 63 to shift the 1 advanced into ring counter 44 back to stage 43 at the end of an analog-to-digital conversion. The ADC Start signal may be provided by the pulse distributor 90 of FIGS. 10, 11, as later described.

The ADC clock pulses 60, as appearing on line 70 of FIG. 9, are applied via the delay and differentiating devices 71, 72 respectively to the comparator gate 69 and to the decision flip-flop 46. The delay afforded by device 71 occurs more than one-half clock cycle after a shift pulse and as close to one clock cycle as possible: the delay afforded by device 72 is greater than one clock cycle: i.e., the pulse applied to the comparator gate 69 occurs at the end of one shift pulse cycle and the same pulse applied to the decision flip-flop 46 occurs in the following shift pulse cycle delayed long enough to insure the completion of the intervening shifting operation. The comparator gate 69 is an AND-gate which will produce an output when a timing pulse is supplied from device 71 and the output of comparator-amplifier 111 is below a specific level approximating zero.

The decision flip-flop 46 is in the output circuit of the comparator-amplifier 111 and responds to the state of balance of the opposing currents respectively supplied to the summing point 19 by the integrator-amplifier 11 and the reference source 27 via one or more of the calibrated resistors 38A–38P. Whenever the flip-flop 46 is turned ON, via comparator-gate 69, its change in state as differentiated by differentiator 48 results in a pulse on the decision line 47. This signal pulse (indicative of the fact that the opposing reference current from source 27 has become more than the analog output of amplifier 111) is applied to one input circuit of the AND-gates 50A–50P. The other input circuit of each of the AND-gates 50A–50P is enabled by the 1 level when appearing on the output line 52 for the next stage of the ring counters. For example, the AND-gate 50A for resetting the flip-flop 41A may be turned ON when the 1 signal is shifted from stage 43A to stage 43B. Thus, if the current passed by resistor 38A (while switch 37A is closed under control of flip-flop 41A) is sufficient to reduce the comparator output below the balance point, the decision pulse as applied via line 47 to one input of AND-gate 50A plus the 1 level on output line 52B of stage 43B resets the flip-flop 41A to open switch 37A and so break the reference current path through resistor 38A. If, on the other hand, the current passed by resistor 38 is insufficient to cause a pulse to appear on decision line 47, the AND-gate 50A remains closed and flip-flop 41A remains set, switch 37A remains closed, and resistor 38A remains energized by the reference current.

In like manner, each of the remaining gates 50B–50P determines whether the corresponding one of the feedback register stages 41B–41P is left set or reset by a decision pulse. Thus, at the end of an ADC cycle, the stages of the register 15p which are left turned ON provide the finalized count representing in digital form the analog value of the Ix or Is output of the integrator-amplifier 11. The count stored in the register 15p at the end of each ADC cycle is transferred over the ADC output lines 45A–45P to one or the other of the registers 15x, 15s (FIG. 10) in the next measuring cycle.

Each of the ADC output lines 45A–45P is applied to one input of a pair of gates whose output lines are respectively connected to corresponding stages of flip-flops of the 15x and 15s registers. Specifically, the ADC output line 45A is connected to one input of each of the AND-gates 80A, 81A: the output line 45B is connected to one input of each of AND-gates 80B, 81B, etc. The other input of each of AND-gates 80A–80P is connected to the transfer line 82x and the other input of each of AND-gates 81A–81P is connected to the transfer line 82s. The outputs of the AND-gates 80A–80P provide set pulses for the corresponding stages 84A–84P of the 15s register, and the outputs of AND-gates 81A–81P provide set pulses for the corresponding stages 85A–85P of the 15x register.

Now assuming the 15x register has been cleared by a reset pulse applied to line 86x, the counts stored in the ADC register 15p can be transferred to the 15x register by application of a pulse to the transfer line 82x. Similarly, if the 15s register has been cleared by a reset pulse applied to line 86s, the counts stored in the ADC register 15p can be transferred to the 15s register by application of a pulse to the transfer line 82s. Thus, by applying transfer pulses to lines 82x, 82s, after alternate conversion cycles, the registers 15x, 15s will contain the two previous ADC counts respectively corresponding with the last-measured Ix and Is analog values.

Figure 11:
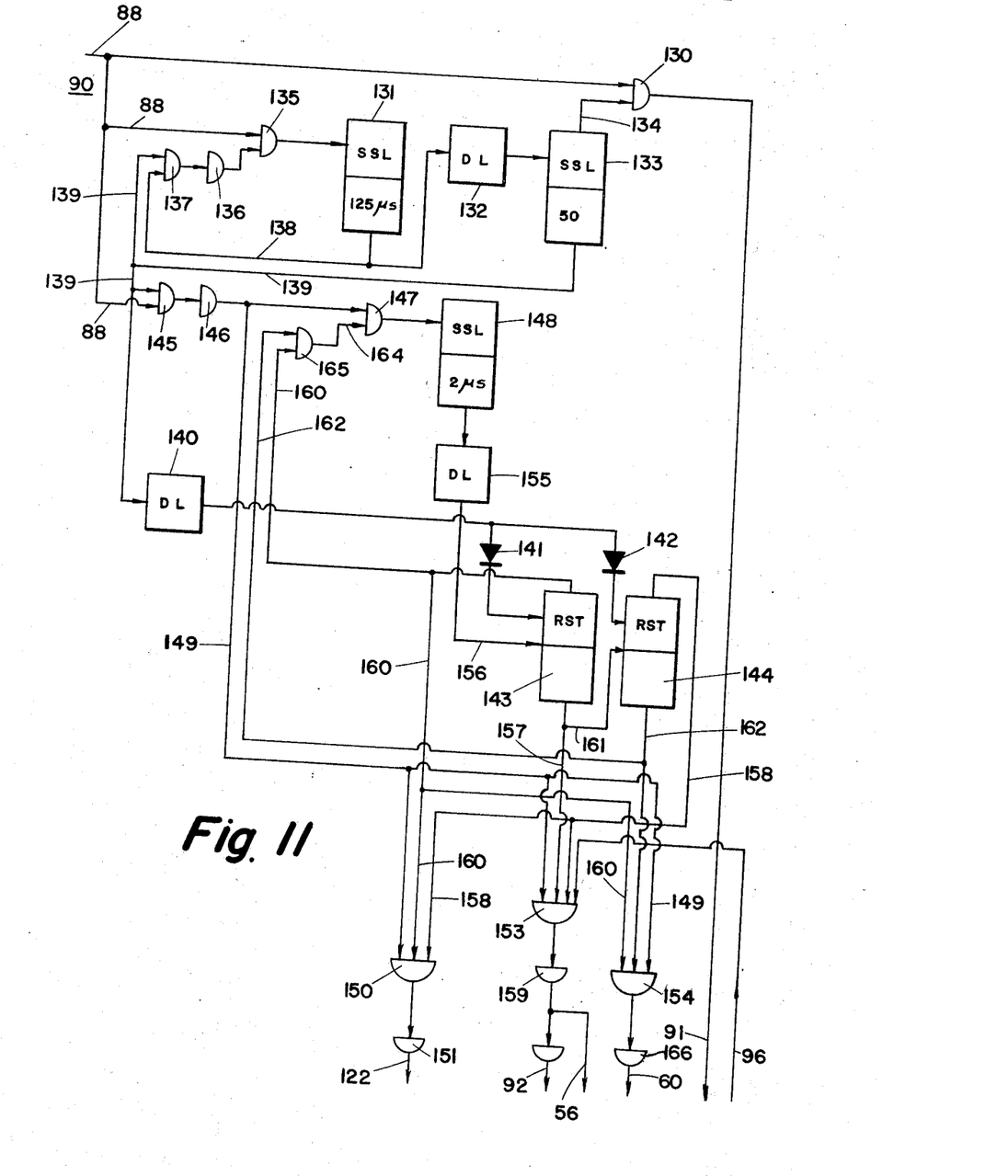
FIG. 11 is a logic diagram of circuitry suitable for the pulse distributor of FIG. 10.

Suitable circuitry for the timing logic block of FIG. 1 is shown in the upper portion of FIG. 10. The synchronizing pulses from amplifier 32, or other suitable source, are applied by line 88 to the pulse distributor 90, a preferred form of which is shown in FIG. 11 and subsequently described. From the second pulse of each synchronizing train, as produced for example by each group of counting slots (FIG. 4), is derived an ADC Start pulse supplied to the ADC line 56 (FIGS. 9, 10): from the third and subsequent pulses of each such synchronizing train are derived the ADC clock pulses supplied to the ADC line 60 (FIGS. 9 and 10). Specifically, for the 16-stage ADC shown in FIG. 10, each synchronizing pulse train will consist of 18 pulses. From the synchronizing pulse corresponding with the single slot 29C (FIG. 4) between each pair of groups of timing slots 29A, 29B is derived a pulse applied to line 91 to determine whether the ADC count should be transferred to register 15x or 15s. The pulse on line 91 is inverted by inverter 114 and applied as one input of AND-gate 115. The other input of AND-gate 115 is provided by output line 116 of flip-flop 117 which is set by a measuring-cycle signal applied to line 118. A signal on the output line 119 of AND-gate 115 sets the flip-flop 97. With the flip-flop 97 in set state, the signal on output line 96 provides one input for each of gates 95s, 95x involved in the transfer of the ADC count to register 15x or 15s.

As above described, the ADC count is transferred to register 15x if that register has been cleared by a reset pulse on line 86x and a transfer pulse has been applied to line 82x whereas the ADC count is transferred to register 15s if that register has been cleared by a reset pulse on line 86s and a transfer pulse has been applied to line 82s. A reset pulse is applied to line 86x by driver 94x when the three input lines of AND-gate 95x are concurrently active. A reset pulse is supplied to line 86s by driver 94s when the three input lines of AND-gate 95s are concurrently active. One input for each of gates 95s, 95x is supplied from the end-of-conversion line 112 of the ADC. A second input for each of gates 95s, 95x is supplied from line 96 by the flip-flop 97 when turned ON. The third input for gate 95x is provided when a 1 signal appears on the lower output line 98x of flip-flop binary counter 93 (2-count), and the third input for gate 95s is provided when a 1 signal appears on the upper output line 98s of the same flip-flop binary counter 93. A 1 signal appears on the upper output line 98s of counter 93 for alternate samplings. This condition only occurs for the first No. 2 pulse occurring after a pulse corresponding with 29C. The next No. 2 pulse on line 92 reverses counter 93 so that a 1 signal appears on its lower output line.

Assuming first that the latter state of binary counter 93 exists: at the end of the current ADC cycle, the pulse appearing on line 112 completes closure of the gate 95s. In consequence, the driver 94s in the output line 99s of gate 95s applies a reset pulse to line 86s to clear the register 15s. The pulse on line 98s also initiates a cycle of the single-shot multivibrator 100. At the end of that cycle (say after two microseconds), the 1 output signal on line 101 of multivibrator 100 and the 1 output signal on line 98s of binary counter 93 are jointly effective as applied to driver 102s to provide a transfer pulse on line 82s. As previously described, such pulse is effective to enable the gates 80A–80P for transfer to register 15s of the 1's count stored in the ADC register 15p during the immediately prior conversion cycle.

Now assuming the former state of binary counter 93 exists (i.e., a 1 level on its lower output line 98x): at the end of the current ADC cycle, the next pulse appearing on line 112 completes closure of gate 95x. In consequence, the driver 94x in the output line 99x of gate 95x applies a reset pulse to line 86x to clear the register 15x. The pulse on line 99x also initiates a cycle of the single-shot multivibrator 100. At the end of that cycle, the 1 output levels on lines 101 and 98x of multivibrator 100 and binary counter 93 respectively are jointly effective as applied to driver 102x to provide a transfer pulse on line 82x. As previously described, such pulse is effective to enable the gates 81A–81P for transfer to register 15x of the 1's count stored in the ADC register 15p during the immediately prior conversion cycle.

As previously mentioned in discussion of FIG. 1, the transistor switch 13 is turned ON in the interval between successive sampling operations to discharge the integrating capacitor 12. The switching signals supplied to the base of the transistors via line 103 (FIGS. 1 and 10) are derived from the network 104 including the diodes 105 connected between line 103 and + terminal 106 of a current supply source and the diodes 107, 108 respectively connected from the flip-flop 109 and the single-shot multivibrator 110 to line 103. The flip-flop 109 is turned ON to close switch 13 via diode 107 when a pulse appears on line 112 at time $t$ (FIG. 2) at the end of an ADC cycle. The same pulse is applied to the single-shot multivibrator 110. At the end of the multivibrator cycle (say after 12 microseconds), the signal level applied by it via diode 108 to line 103 opens the switch 13 in readiness for integration by amplifier 11 of the next sample Ix or Is. The line 113 from flip-flop 97 to flip-flop 109 provides, as later explained, a signal which inhibits closure of switch 13 when, in the sampling cycle, there occurs a cross-over at the Ix and Is amplitudes. During the measuring cycle, the flip-flop 97 is continuously in set state with a 1 signal on line 91. The flip-flop is put in the set state by a signal on the measuring Start line 118.

At the time of the first pulse of each synchronizing train, the converted value of the last sample is still in the ADC register 15p, although that value has been transferred to the selected register 15x or 15s. Thus, the comparator-amplifier 111, until the second pulse of the train occurs to start the next ADC cycle, is comparing that value with that of the new integrated sample to be converted at the time of occurrence of the first synchronizing pulse. The first synchronizing pulse thus provides a strobe pulse on line 122 to the gate 123; the input line 98s is enabled for every other pulse train because of the then state of counter 93; the input line 96 of AND-gate 123 is then enabled because of the then state of flip-flop 97; the input line 121 from the comparator-amplifier 111 may or may not then be enabled. Thus, if the new reference value being stored in capacitor 12 is greater than the unknown stored in the ADC register, the AND-gate 123 is enabled by the stroke pulse and the measuring cycle terminates at the end of the pulse train. Specifically, when the gate 123 is enabled, the signal on line 124 initiates a cycle of the single-shot multivibrator 125. At the end of that cycle, the signal on its output line 126, as differentiated by differentiator 127, is effective via line 128 to reset the flip-flop 117 and to reset the flip-flop 97. The resulting signal on output line 113 of flip-flop 97 is effective, as above stated, to inhibit closure of switch 13.

It is to be noted that the comparator-amplifier 111 of the ADC 10 serves two purposes. During the measuring cycle, the comparator controls the conversion from analog-to-digital form of the values of the unknown and the reference, and before the next conversion it compares the last unknown value, as stored in the set resistors of the group 38A–39P with the next reference value in the integrator. As will now be explained, when such comparison reveals that the reference value is greater than the unknown, then the ADC 10 stops upon completion of such next conversion. The pulse distributor is precluded, by the $\bar{1}$ inhibit signal on line 96 by flip-flop 97, from producing an ADC Start signal from any subsequent synchronizing pulses on line 88. The following discussion of distributor 90 (FIG. 11) describes how such inhibit signal prevents further operation of the ADC 10.

All of the synchronizing pulses on line 88 are applied to one input of AND-gate 130. The first synchronizing pulse of group 29A–29B, as applied to the single-shot multivibrator 131, is effective after an interval (of say 125 microseconds), somewhat greater than the time-span of group 29A–29B—to produce a signal which as differentiated by differentiator 132 is applied to initate a cycle of a second single-shot multivibrator 133. This second multivibrator has a cycle duration (of say 50 microseconds) which embraces the interval between group 29A and the next group 29B, or a group 29B and the next group 29A during which a single pulse 29C may or may not occur. During the cycle, the output line 134 of the multivibrator 133 enables the AND-gate 130. If during that cycle a pulse 29C appears on line 88, the AND-gate 130 produces on line 91 a pulse which, as above described, is applied to counter 93 and flip-flop 97 of FIG. 10. If, on the other hand, no pulse appears on line 88 (there is none in the interval from 29B to 29A), then no pulse appears on line 91.

To prevent the first signal-shot multivibrator 131 (FIG. 11) from being started by a 29C pulse, or any spurious signal, the AND-gate 135 is interposed in line 88. The other input of gate 135, as applied to it via inverter 136 and gate 137, is active only after both delay cycles afforded by the single-shot multivibrators 131 and 133. To that end, the input lines 138, 139 of gate 137 are respectively connected to those two single-shot multivibrators as shown. The RETURN-TO-OFF signal of single-shot multivibrator 133 as appearing on line 139 is also applied via differentiator 140 and diodes 141, 142 to reset the binary counter stages 143, 144. The signal on output line 139 of the single-shot multivibrator 133 is also applied to the AND-gate 145 so that the synchronizing pulse appearing on line 88 after the delay time of both multivibrators is passed by gate 145 via inverter 146 and over the line 149 to the gate 150. At this time, the other input lines 158, 160 are enabled so that the first pulse of each group 29A, 29B is passed by gate 150 and, as inverted by inverter 151, appears on the first-pulse line 122 for transmission to the gate 123 of FIG. 10. However, at this time the gates 153, 154 also connected to line 149 do not produce an output pulse because their other input lines are not enabled.

The first synchronizing pulse of each group as passed by gate 145 is also passed by AND-gate 147 whose other input line 164 is at that time enabled so to initiate a cycle of the single-shot multivibrator 148. The RETURN-TO-OFF signal from multivibrator 148, as differentiated by differentiator 155, is applied by line 156 to reverse the state of counter stage 143.

The resulting output of counter 143 as appearing on line 157 activates one of the four input lines of gate 153. At that time the input line 158 for gate 153 from counter stage 144 is active and no inhibit signal is on its input line 96. Thus, when the second synchronizing pulse as appearing on line 149 is applied to gate 153, it is passed by that gate and inverted by inverter 159 to provide an ADC Start signal on line 56. The inverted output signal of gate 153 is re-inverted and applied to line 92 for transmission to the ADC 10.

It is to be noted that the second synchronizing pulse is not passed by AND-gate 150 because at that time the signal on its input line 160 from counter stage 143 is a non-enabling signal. The second synchronizing pulse of each train, as delayed by the single-shot multivibrator 148, is effective via line 156 to restore counter stage 143 to its first state. In such state, the signal on output line 161 of the first counter stage 143 reverses the state of the second counter stage 144, thereby enabling input line 162 of gate 154. At that time the input line 160 for gate 154 is also enabled so that the third synchronizing pulse appearing on line 149 is passed by gate 154, and as inverted by inverter 166 provides a clock pulse on line 60 for transmission to the ADC 10.

It is to be noted that the third synchronizing pulse is not passed by either of gates 150 or 153 because the signal then appearing on line 158 is a non-enabling signal.

The fourth and subsequent synchronizing pulse of each train is also passed by gate 154 because those pulses are precluded from initiating a cycle of single-shot multivibrator 148 by an inhibit signal on input line 164 of AND-gate 147. Such inhibit signal is derived from the states of the counter stages 143, 144 by way of AND-gate 165 and output lines 160, 162 of the counter stages.

It is to be noted that when an inhibit signal appears on line 96 from the ADC 10, the gate 153 is inhibited. Consequently, when the second synchronizing pulse of the next train is applied to gate 153, it does not provide a Start signal for the converter and a non-enabling signal is applied to line 56 for transmission to the converter.

Figures 12, 13, 14:
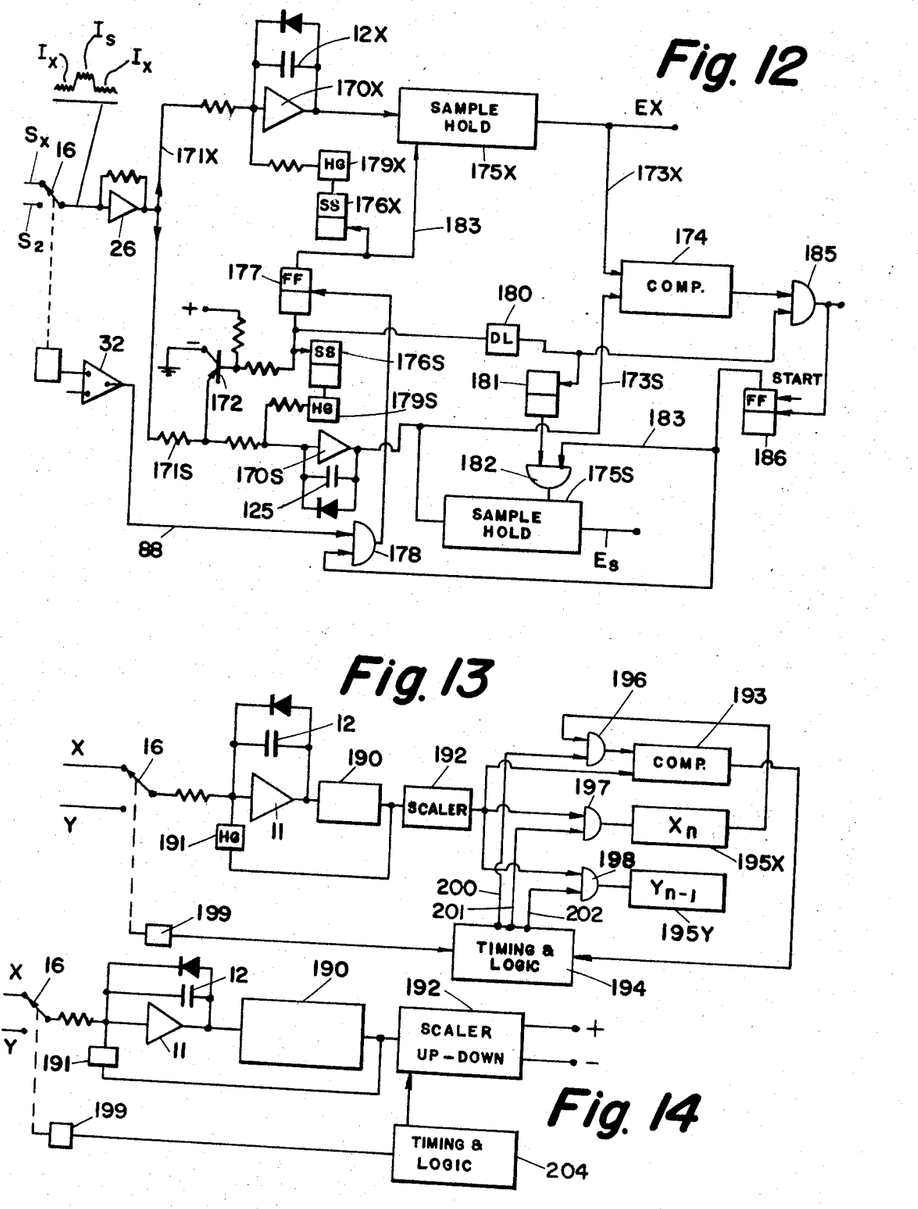
FIGS. 12 to 14 are modifications of the comparison-measurement circuitry of FIG. 1.

The two-source comparison circuitry shown in FIG. 12 does not use an ADC converter and requires no interval (such as Pc of FIG. 2) between a pair of samples respectively from sources S1, S2. In this modification, the integrating means for the analog samples Ix, Is comprises two integrator-amplifiers 170x, 170s having a common input channel including amplifier 26 for the Ix, Is pulses.

The amplifier 170s integrates only the Is samples because when an Ix sample is on its input line 171s, the switch 172 is closed. For each sampling cycle, the amplifier 170s thus applies to the input line 173s of comparator 174 a ramp signal rising to the full analog value of the output of source S1. Such signal is compared by comparator 174 with the signal then appearing on its other input line 173x. The latter signal is the full analog valve of the preceding Ix pulse as integrated by amplifier 170x and stored in the Sample-hold circuit 175x. This hold circuit is reset to zero level by a pulse on output line 183 of flip-flop 177. Such Sample-hold circuit may be similar to integrator-amplifier 170s with its associated reset components.

At the beginning of a sampling cycle, integrator-amplifier 170x is set to zero; and integrator-amplifier 170s is disconnected from the output of amplifier 26 by the action of gate transistor 172, which is switched ON: the current Ix is then integrated during the X sampling period by amplifier 170x. At the end of the X sampling period, the synchronizing signal from gate 178 reverses binary flip-flop 177, triggering single-shot multivibrator 176x and turning ON the sample and hold amplifier 175x to set its internal storage capacitor to a voltage equal to the voltage at the output of integrator 170x, so storing the latter value. At the same time the input gate transistor 172 is turned OFF, permitting the integration of the current I$_s$ during the succeeding S sampling period. Toward the end of the S sampling period, integrator 170x is reset by the differentiated output pulse generated by differentiator 179x in response to the return at the appropriate time to normal state of single-shot multivibrator 176x. At the end of the S sampling period, the synchronizing signal from gate 178 reverses flip-flop 177, thus turning ON gate transistor 172 and disconnecting integrator-amplifier 170s from amplifier 26, setting single-shot multivibrator 176s and, through differentiator 180, setting single-shot multivibrator 181 and strobing gate 185.

If the comparator output 174 has one polarity (for instance plus), gate 185 will be inhibited, and binary flip-flop 186 will not be reversed; gates 182 and 178 will continue to be enabled. Thus, when single-shot multivibrator 181 returns to its normal state, before the end of the next X sample period, the sample and hold amplifier 175s will be turned ON to set its storage capacitor to a voltage equal to the voltage at the output of integrator 170s. A little later, but still during the X sample period, single-shot multivibrator 176s returns to its normal state and its differentiated output, through differentiator 179s, resets integrator-amplifier 170s. Gate 178 being open passes the next synchronizing pulse to terminate the X sampling period.

If at the time gate 185 is strobed the comparator output 174 has the opposite sign (for example, negative), the output gate 185 will be enabled and binary flip-flop 186 will be reversed, closing gates 182 and 178. Thus, when single-shot multivibrator 181 returns to normal, the sample and hold amplifier 175s will be unaffected, and will remain at the value equal to the penultimate S sample integral. Gate 178 being closed prevents any further synchronizing pulses from affecting the circuit. Thus, the analog value stored in sample and hold amplifier 175s corresponds with the digital value stored in the register 15s of FIG. 1; the analog value stored in integrator-amplifier 170s corresponds with the digital value stored in register 15p of FIG. 1; and the analog value stored in sample and hold amplifier 175x corresponds with the digital value stored in register 15x of FIG. 1.

Another modification which does not use an ADC converter is shown in FIG. 13. In this circuit, the output of the integrator-amplifier 11 is applied via a Schmitt trigger circuit 190 to a binary scaler 192. The output of the trigger 190 is also applied via high output driver 191 to the input of the integrator-amplifier to reset the latter. The switching means 16 alternately connects the amplifier 11 to the two sources of analog signals x and y. Since the trigger 190 produces a pulse each time its input rises to a preset level during a sampling period, the number of pulses applied to scaler 192 for one state of switch 16 is proportional to the integral of the analog value of x and the number of pulses applied to the scaler 192 for the opposite state of switch 16 during the succeeding sampling period is proportional to the integral of the analog value of y.

The output of scaler 192 is applied to one input of each of the AND-gates 196, 197, 198. The other input lines 200–202 for the respective gates 196–198 are sequentially activated by the timing and logic circuitry 194 which is synchronized with switch 16. The registers 195x, 195y are respectively in the output circuits of AND-gates 197, 198. The enabling pulses supplied by the logic circuitry 194 to input lines 200–202 of the gates are so timed that registers 195y, 195x store successive values of Y and X and the scaler 192 stores the most recent value of X or Y.

The outputs of register 195x and of the scaler 192 are applied to comparator 193 so that a change in sign of the comparator output may be utilized, generally as in FIGS. 10, 11, to stop the timing circuitry when the balance or match point has been passed. Thus, the integral of the analog value stored in register 195y corresponds with the digital value stored in register 15s of FIG. 1; the integral of the analog value stored in scaler 192 corresponds with the value stored in register 15p of FIG. 1; and the analog value stored in register 195x corresponds with the digital value stored in register 15x of FIG. 1.

Still another modification which does not use an ADC converter is shown in FIG. 14. This circuit is similar to that of FIG. 13 in that a trigger circuit 190 in the output circuit of the integrator-amplifier 11 applies to the scaler 192 in each measuring cycle a number of pulses proportional to the integral of the analog value of an X sample and a number of pulses proportional to the integral of the analog value of a Y sample. In FIG. 14, however, the timing circuitry 204 controls the scaler 192 to count in one direction for X samples and in the opposite direction for Y samples and resets the scaler 192 to zero at the end of each sampling cycle. Thus, a reversal in sign of the output of the scaler 192 at the end of an up-and-down count indicates that the match or balance point has been passed.

It is to be understood that in any of the above-described embodiments of the invention, or in any other embodiment thereof, the signal generated by a comparator to stop the timing circuitry when a match or balance point has been passed may be alternatively or additionally used for other purposes, such as control or measurement of a characteristic of a source, and the timing circuitry may be allowed to run, or may be restarted automatically to initiate another cycle of measurement or control.

It is also to be understood the invention is not limited to optical pyrometry or to the specific data-processing circuitry disclosed, but also comprehends modifications and equivalents within the scope of the appended claims.

What is claimed is:
1. A measuring system comprising:
  integrator means,
  periodic means for applying to said integrator means samples from two sources, unknown and reference, which are to be compared,
  storage means to store the value of the integration corresponding with one of the sampled sources,
  comparator means effective to compare the output of storage means with the most recent value of the output of said comparator means corresponding with the other sampled source,
  an analog-to-digital converter including as said storage means a register in which the digital counts of the analog values of the unknown and the reference are alternately temporarily stored in the successive inter sampling intervals,
  timing and logic circuitry,
  two registers in addition to said converter register,
  pulse-producing means operating in synchronism with said periodic means to apply to said timing and logic circuitry pairs of pulse trains respectively corresponding with the sampling periods of the unknown and the reference and an intervening transfer pulse,
  said circuitry including means responsive to said transfer pulse for controlling transfer of digital counts successively stored in said converter register alternately to said two additional registers,
  said circuitry until a match of the compared outputs is attained, deriving from each of said pulse trains (a) a start signal for initiating a cycle of the converter, (b) clock pulses for advancing the digital count in the converter register until such count closely approximates the analog value of the sample then stored in the integrator means, and (c) a pulse for resetting the integrator means to receive the next sample,
  said circuitry when said match is attained, receiving from said comparator means an inhibit signal precluding it from deriving from the next pulse train the start and clock pulses for the converter and the reset pulse for the integrator means.

2. A measuring system comprising:
  integrator means,
  periodic means for applying to said integrator means samples from two sources, unknown and reference, which are to be compared,
  storage means to store the value of the integration corresponding with one of the sampled sources,
  comparator means effective to compare the output of said storage means with the most recent value of the output of said comparator means corresponding with the other sampled source,
  an analog-to-digital converter including said storage means,
  timing and logic circuitry, and
  pulse-producing means operating in synchronism with said periodic means to apply to said circuitry pairs of pulse trains respectively corresponding with the sampling periods of the unknown and the reference, said circuitry until a match of the compared outputs is attained, deriving from each of said pulse trains (a) a start signal for initiating a cycle of the converter, (b) clock pulses for advancing the digital output count of the converter during its cycle until it closely approximates the analog value of the sample then stored in the integrator means, and (c) a pulse for resetting the integrator means in readiness for the next sample,
  said circuitry when said match is attained, receiving from said comparator means an inhibit signal preventing it from deriving from the next pulse train a start signal for the converter, clock pulses for the converter, or a reset pulse for the integrator means.

3. A measuring system as in claim 2 in which the timing and logic circuitry comprises:
  a pulse distributor to which recurrent pairs of trains of pulses are applied, and
  three gating means within said distributor respectively selectively passing the first pulse of each train as a strobe signal, the second pulse of each train as a start signal for an analog-to-digital converter, and the subsequent pulses as clock pulses for such converter,
  the second of said gating means being inhibited by a signal from the converter until the converter register is cleared.

4. A measuring system comprising:
  an analog-to-digital converter,
  an integrator in the analog-input circuit of said converter,
  periodic means for alternately supplying to said integrator samples of an unknown and of a reference and for providing for intersampling intervals during which the analog value of the preceding sample is stored in the integrator,
  timing means synchronized with said periodic means to initiate a cycle of said converter for conversion to digital form of the analog value stored in the integrator, to reset the integrator upon completion of a converter cycle, and to preclude further operation of the converter when, upon application to the converter of two successive analog values in predetermined sequence, the difference between said values is of sign opposite from the difference between the earlier of said values and the preceding analog value,
  said converter including a comparator which during a cycle of the converter effects at least an approximate match between the integrated analog value then stored in the integrator and an internal standard and which during an intersampling interval compares the analog value being integrated by said integrator with the previous analog value stored in the converter to produce a signal which either permits or precludes said timing means to reset the integrator and initiate another cycle of said converter in dependence upon the sign of the signal,
  said periodic means including means for repeatedly producing two trains of synchronizing pulses respectively related to the unknown and reference samples,
  means in said timing means normally responsive to a predetermined pulse of each train to produce a start signal for said converter, and
  means jointly responsive to an earlier pulse of each train and to the signal from said comparator to determine whether or not said later-predetermined pulse is permitted to pass to said responsive means.

5. A measuring system as in claim 4 in which:
  said analog-to-digital converter is responsive during successive intersampling intervals to receive the analog output of said integrator corresponding with the previous sample and has a register to store the corresponding digital count for the following sampling period, and in which
  said comparator is effective during successive intersampling intervals to compare the sample being accumulated in the integrator with the previous sample stored in said register and to stop the converter whenever the analog value being accumulated in the integrator during an intersampling passes through the analog value of the previous sample stored, the digital count then in the converter register corresponding with at least a close match between the unknown and the reference.

References Cited

UNITED STATES PATENTS

| | | | |
|---|---|---|---|
| 2,521,789 | 9/1950 | Grosdoff | 328—13 X |
| 2,537,427 | 1/1951 | Seid | 250—233 |
| 2,629,824 | 2/1953 | MacKay | 328—2 |
| 2,653,247 | 9/1953 | Lundahl | 328—1 |
| 2,927,312 | 2/1960 | Piel | 328—119 |
| 3,158,759 | 11/1964 | Jasper | 328—151 |
| 3,207,996 | 9/1965 | Sundstrom | 328—149 |
| 3,264,480 | 8/1966 | Zuck | 328—127 |
| 3,312,828 | 4/1967 | Wingate | 250—233 |

ARTHUR GAUSS, *Primary Examiner.*

H. DIXON, *Assistant Examiner.*

U.S. Cl. X.R.

250—233; 307—235, 293